Sept. 10, 1957 W. B. BEARD 2,805,612
LATERALLY SHIFTABLE POWER DRIVEN ORCHARD CULTIVATOR
Filed Jan. 26, 1955
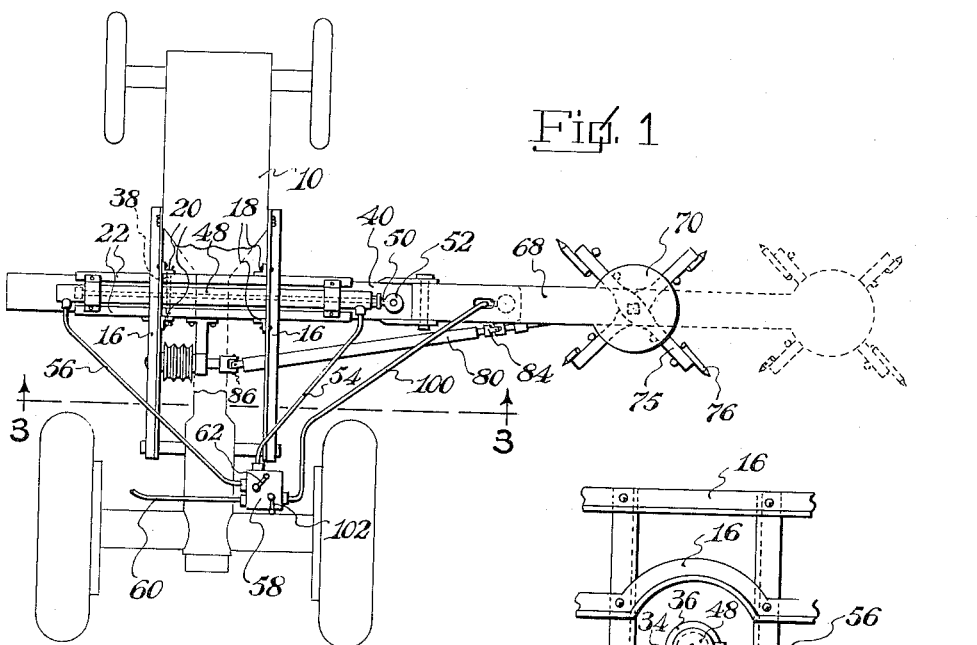
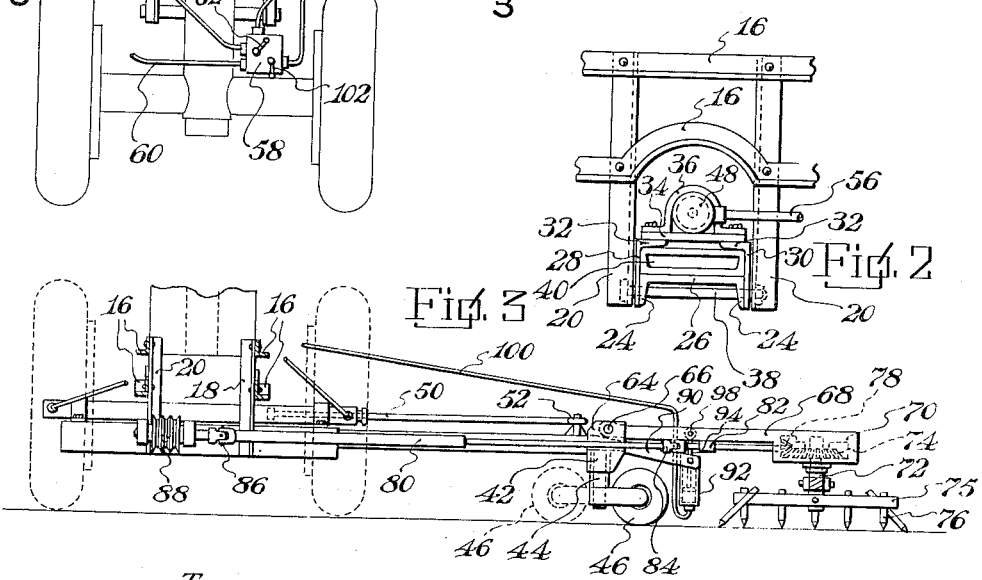
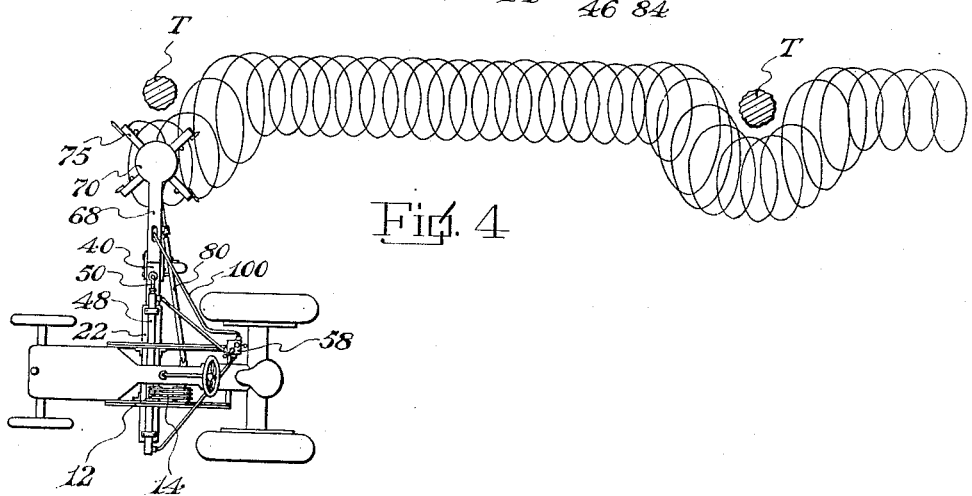

United States Patent Office 2,805,612
Patented Sept. 10, 1957

2,805,612

LATERALLY SHIFTABLE POWER DRIVEN ORCHARD CULTIVATOR

Wesley B. Beard, Tulsa, Okla.

Application January 26, 1955, Serial No. 484,199

5 Claims. (Cl. 97—43)

This invention relates to improvements in cultivating apparatus and is particularly directed to an improved rotary harrow for the cultivation of orchards.

The primary object of this invention is to provide a rotary cultivator attachment that is mountable on a tractor and has its rotary action produced by the power take-off means of the tractor and is positioned laterally of the tractor and is adjustable inwardly and outwardly laterally of the tractor and up and down about axes parallel to the longitudinal axis of the tractor.

Another object of this invention is to provide a harrowing attachment which eliminates criss-cross harrowing between trees, as is conventional cultivation practice, and which includes a supporting ram that laterally extends from the tractor and is hydraulically actuated to laterally extend and retract the harrow head relative to the tractor so that the harrow head is moved into and out of the spaces between trees in a row as the tractor moves in a straight line along the row.

A further object of this invention is to provide a supporting track which is underslung on the tractor and disposed transversely thereof and which slidably supports a ram that is reciprocated in the track by a hydraulic system and which carries a harrow beam at its outer end, the beam supporting rotary harrow arms which are rotated by a telescopingly splined and universally jointed drive shaft powered by the power take-off of the tractor.

A still further object of this invention is to provide means for pivotally supporting the track so that it may move vertically about an axis parallel to the longitudinal axis of the tractor in order to compensate for terrain irregularities and to provide a rotatable ground engaging castered wheel which supports the outer end of the ram.

A still further object of this invention is to provide means for pivotally attaching the harrow beam to the outer end of the ram for vertical swinging movement thereof about an axis parallel to the longitudinal axis of the tractor and to provide a vertical hydraulic unit that underlies the beam and is adapted to raise and lower the beam to control the depth of the cut of the tines of the harrow.

The foregoing and ancillary objects, including the provision of a compact, simple and inexpensive orchard cultivator attachment, are attained by this invention, the preferred form of which is set forth in the following description and illustrated in the accompanying drawings, wherein:

Figure 1 is a top plan view of an orthodox tractor to which is attached the rotary orchard cultivator, which is shown in top plan;

Figure 2 is a rear end elevational view of the attachment;

Figure 3 is a cross-sectional view taken on line 3—3 of Fig. 1 and showing the rear side of the attachment; and Figure 4 is a top plan view, somewhat diagrammatically illustrated to show the operational technique of the attachment.

Referring now more particularly to the drawing, the numeral 10 generally designates an orthodox tractor having a conventional power take off unit 12 to which drive transmission belts 14 are suitably connected.

Longitudinal frame bars 16 are fixed to the opposite sides of the body of the tractor and support pairs of vertical angle iron frame bars 18 and 20. The bars 18 depend from one side of the body and the bars 20 depend from the other side. The bars of each pair are spaced the same distance apart longitudinally of the body and receive therebetween a ram track 22.

The ram track, as shown in Fig. 2, is made up of an inverted channel 24, the web 26 of which defines the bottom of the track, and angle side pieces 28 and 30, which are secured to the sides of the channel 24, and which have their horizontal flanges 32 inturned and forming the top of the track in complemental relation to the bottom. Cross bars 34 interconnect the flanges and form supports for U-shaped brackets 36, for a purpose to be described.

The track is disposed transversely below the tractor body and is normally in a horizontal plane with its bottom and top flanges and sides forming an elongated guide channel. The track is disposed between the pair of bars 18 that act as guides for the track in its vertical movement. In the latter respect, the track is pivoted on a fulcrum rod 38 which extends transversely between the bars 20 and is disposed longitudinally of the tractor body. The track is mounted to swing vertically about said fulcrum to compensate for terrain irregularities.

A ram 40 is slidably mounted in the track and has a depending collar 42 on its outer end, which collar rotatably supports the spindle 44 of a ground engaging caster wheel 46. The wheel is rotatable 360° in the collar and supports the outer end of the ram. The wheel and the fulcrum rod constitute the support points for the track 22 and ram 40 which are movable into angular vertical positions to compensate for terrain irregularities.

A double acting hydraulic cylinder 48 is fixed by the brackets 36 on the cross bars of the track in a position axially overlying the ram and a piston rod 50 is sealingly and slidably extended from the front end of the cylinder. The piston rod is attached, as at 52, to the ram to reciprocate it in the track. The cylinder has fluid lines 54 and 56 connected thereto, adjacent its front and rear ends, and the lines extend from a hydraulic control valve box 58. The control box is mounted in an easily accessible position for the operator on the tractor and is provided with a fluid line 60 which is in fluid communication with a source of fluid pressure, such as a pump (not shown) and located remotely on the tractor and driven thereby in a conventional manner. The valve control handle 62 controls the fluid flow to and from the lines 54 and 56 to control the reciprocation of the piston rod and ram.

The ram is provided at its outer end with apertured ears 64 which carry a pivot element 66 to which the inner end of a harrow beam 68 is attached, the beam being thereby mounted on the outer end of the ram for independent vertical swinging movement about an axis parallel to the axis of the tractor. The beam has a gear housing 70 provided at its outer end and in which a vertical shaft 72 is rotatably journalled and driven by a horizontally disposed bevel gear 74. The shaft 72 carries radially disposed harrow arms 75 at its lower end and the arms support tines 76, in an orthodox fashion.

A bevel gear 78 is enmeshed with the gear 74 and is carried by the outer end of a telescopically arranged and longitudinally splined drive shaft 80. The outer section of the shaft is rotatably supported by a bearing sleeve 82 carried by the underside of the beam and is provided with a universal joint 84 to allow for the independent pivotal movement of the beam. The inner end of the drive shaft is connected by a universal joint 86, which compensates for the angular change of the unit and the supporting frame on the body, to the shaft of a pulley 88, to which the belts 14 are connected.

The outer end of the ram carries a pair of downwardly and forwardly extending arms 90 which support a vertical cylinder 92. The cylinder 92 has a piston rod 94 slidably extending upwardly from the upper end thereof. The piston rod 94 is pivotally attached at its upper end to the underside of the beam by a pivot 98 and moves the beam about the pivot 66. A flexible fluid line 100 is connected to the lower end of the cylinder and is connected to the control box, with the fluid flow in the line being controlled by the valve handle 102.

In use, the tractor draws conventional straight harrows (not shown) behind it and the ram and harrow beam extend laterally from the tractor, as shown in Fig. 4. The ram is extended outwardly from the tractor to position the rotary harrow arms 75 in the row between the trees. The arms are rotated by the meshing gears 74 and 78 and the drive shaft 80 through the drive transmission means from the power take off unit 12. The depth of the cut of the tines is controlled by the angle of the beam on the outer end of the arm. To adjust the depth of the cut, the handle 102 is manipulated to extend or retract the piston rod 94 which moves the beam about the pivot 66. The entire unit is raised and lowered automatically by the wheel 46 which raises and lowers the entire unit about the fulcrum 38 in accordance with terrain irregularities.

When the beam approaches a tree, such as T of Fig. 4, then the ram is retracted in the track to move the beam inwardly toward the moving tractor so that it passes around the tree T. The swirled path, shown in Fig. 4, illustrates the pattern of the outer harrow arms.

While the preferred form of this invention has been shown and described herein, other forms may be realized as coming within the scope of the invention defined by the appended claims.

What is claimed is:

1. For use with a tractor having a power take off, a rotary orchard cultivator attachment comprising a track adapted to be disposed transversely of and beneath a tractor, a supporting frame for the track adapted to be fixed to the tractor, means pivotally mounting the track on the frame for vertical swinging movement of the track about an axis parallel to the longitudinal axis of the tractor, a ram slidably mounted in the track and movable laterally of the tractor to extend at one end outwardly from the tractor, hydraulic means for reciprocating the ram in the track, a ground engaging wheel carried by the ram and supporting said ram adjacent at its outer end and said track, a harrow beam carried by the ram and extending axially outwardly therefrom, means pivotally attaching the harrow beam to the ram for vertical swinging movement of the beam about an axis parallel to the longitudinal axis of the tractor, rotary harrow arms carried by the beam and depending therefrom, a telescopically arranged and longitudinally splined drive shaft carried by the beam and substantially paralleling the beam and ram and having universal points accommodating the angular movement of the ram and the beam, means connecting the drive shaft to the power take-off, means connecting the drive shaft to the rotary arms and hydraulic means moving said beam to and holding it in selected angular positions relative to the ram to control the depth of the cut by the harrow arms, said wheel moving the beam and the ram vertically as a unit about the pivotal mount for the track in response to the contour of the ground.

2. An attachment as claimed in claim 1, wherein said hydraulic means reciprocating the ram includes a cylinder mounted on the track in axial alignment therewith and having a piston rod connected to the ram and control means for actuating the piston rod to extend and retract the ram in the track.

3. An attachment as claimed in claim 1, wherein said last means includes a vertical hydraulic cylinder, means carried by the ram for supporting the hydraulic cylinder in a vertical position below the beam, a piston rod projecting upwardly from the said cylinder and pivotally connected to the beam, a fluid pressure line connected to the vertical cylinder from a fluid pressure source and control means associated with said line.

4. An attachment as claimed in claim 1, wherein said beam is disposed in end to end relation with the ram, said ram having an outer end provided with element ears carrying a pivot element on which the beam is mounted and said wheel being rotatably carried by the ram at the outer end thereof.

5. An attachment as claimed in claim 1, wherein said supporting frame includes a pair of vertical arms on one side of the tractor and a second pair of vertical arms on the other side of the tractor, said track being disposed between and pivoted to the first pair of arms and disposed between the second pair of arms which serve as guides for the ram in its vertical swinging movement.

References Cited in the file of this patent

UNITED STATES PATENTS

| | | |
|---|---|---|
| 1,570,415 | Sumbulian | Jan. 19, 1926 |
| 2,510,779 | Hancock | June 6, 1950 |
| 2,630,746 | Thompson | Mar. 10, 1953 |
| 2,694,355 | Pertics | Nov. 16, 1954 |